United States Patent
Sillard et al.

(10) Patent No.: US 10,838,142 B2
(45) Date of Patent: Nov. 17, 2020

(54) MULTIMODE OPTICAL FIBER OPTIMIZED TO OPERATE AROUND 1060 NM, AND CORRESPONDING MULTIMODE OPTICAL SYSTEM

(71) Applicant: Draka Comteq France, Paron (FR)

(72) Inventors: Pierre Sillard, Paron (FR); Denis Molin, Paron (FR); Marianne Bigot, Paron (FR)

(73) Assignee: Draka Comteq France, Paron (FR)

( * ) Notice: Subject to any disclaimer, the term of this patent is extended or adjusted under 35 U.S.C. 154(b) by 0 days.

(21) Appl. No.: 16/482,774

(22) PCT Filed: Feb. 3, 2017

(86) PCT No.: PCT/IB2017/000216
§ 371 (c)(1),
(2) Date: Aug. 1, 2019

(87) PCT Pub. No.: WO2018/142175
PCT Pub. Date: Aug. 9, 2018

(65) Prior Publication Data
US 2019/0353841 A1    Nov. 21, 2019

(51) Int. Cl.
*G02B 6/028* (2006.01)
*G02B 6/036* (2006.01)

(52) U.S. Cl.
CPC .......... *G02B 6/0288* (2013.01); *G02B 6/0365* (2013.01)

(58) Field of Classification Search
CPC .................. G02B 6/0288; G02B 6/0365
See application file for complete search history.

(56) References Cited

U.S. PATENT DOCUMENTS

| | | |
|---|---|---|
| 8,977,092 B2 | 3/2015 | Bickham et al. |
| 10,107,957 B2 | 10/2018 | Bickham et al. |

(Continued)

FOREIGN PATENT DOCUMENTS

| | | |
|---|---|---|
| EP | 2339384 A1 | 6/2011 |
| WO | 2013/181182 A1 | 12/2013 |

(Continued)

OTHER PUBLICATIONS

International Preliminary Report on Patentability in counterpart International Application No. PCT/IB2017/000216 dated Aug. 6, 2019, pp. 1-8.

(Continued)

*Primary Examiner* — Daniel Petkovsek
(74) *Attorney, Agent, or Firm* — Additon, Higgins & Pendleton, P.A.

(57) ABSTRACT

A multimode optical fiber (10) comprises an a-profile graded index core, a trench (13) surrounding the core (11) and an intermediate cladding (12) between the core and the trench. Such a multimode optical fiber (10) has: —A mode carrying capacity between 54 and 68 LP modes at 1060 nm, defined by a specific relationship between the numerical aperture of the core and the core radius, —A defined relationship between trench, core and intermediate cladding parameters to achieve a high bandwidth and low bend-loss at 1060 nm, and—A core radius between 24 and 26 μm, a numerical aperture between 0.190 and 0.225 and a value of a between 2.01 and 2.05 to retain compatibility with legacy fibers.

19 Claims, 4 Drawing Sheets

(56) References Cited

U.S. PATENT DOCUMENTS

| | | |
|---|---|---|
| 10,324,253 B2 * | 6/2019 | Sillard ................ G02B 6/0365 |
| 2011/0135263 A1 | 6/2011 | Molin et al. |
| 2013/0039626 A1 | 2/2013 | Bickham et al. |
| 2013/0077926 A1 | 3/2013 | Bickham et al. |
| 2016/0363725 A1 | 12/2016 | Bigot et al. |
| 2017/0248755 A1 | 8/2017 | Bigot et al. |

FOREIGN PATENT DOCUMENTS

| | | |
|---|---|---|
| WO | 2015/126895 A1 | 8/2015 |
| WO | 2015/128691 A1 | 9/2015 |
| WO | 2016/038414 A1 | 3/2016 |
| WO | 2018/142175 A1 | 8/2018 |

OTHER PUBLICATIONS

International Search Report in counterpart International Application No. PCT/IB2017/000216 dated Oct. 30, 2017, pp. 1-2.

\* cited by examiner

MULTIMODE OPTICAL FIBER OPTIMIZED TO OPERATE AROUND 1060 NM, AND CORRESPONDING MULTIMODE OPTICAL SYSTEM

1. FIELD OF THE INVENTION

The present invention relates to the field of optical fiber transmissions, and more specifically, to multimode fibers used for short distance transmission systems requiring a large bandwidth. More specifically, the invention relates to multimode optical fibers designed to fulfill the high bit rate requirements of next generation 400 GbE systems.

2. BACKGROUND

Multimode fibers are successfully used in high-speed data networks together with high-speed sources that are typically using transversally multimode vertical cavity surface emitting lasers, more simply called VCSELs. Multimode fibers operating at 850 nm and 1300 nm are well known.

Multimode fibers are affected by intermodal dispersion, which results from the fact that, in a multimode fiber, for a particular wavelength, several optical modes propagate simultaneously along the fiber, carrying the same information, but travelling with different propagation velocities. Modal dispersion is expressed in terms of Differential Mode Delay (DMD), which is a measure of the difference in pulse delay (ps/m) between the fastest and slowest modes traversing the fiber.

Typically, an optical fiber should have the broadest bandwidth, for it to be used in high bandwidth applications. For a given wavelength, the bandwidth may be characterized in several different ways. Typically, a distinction is made between the so-called overfilled launch condition (OFL) bandwidth and the so-called effective modal bandwidth condition (EMB). The acquisition of the OFL bandwidth attunes the use of a light source exhibiting uniform excitation over the entire radial surface of the optical fiber (using a laser diode or a Light Emitting Diode (LED)). The calculated effective modal bandwidth (EMBc) derived from the DMD measurement has been developed to estimate the minimum Effective Modal Bandwidth of the 50 μm core diameter fiber under inhomogeneous excitation over its radial surface, as it is when using a Vertical Cavity Surface Emitting Laser (VCSEL) source operating at 850 nm.

Embodiments of the method measuring DMD and calculating the effective modal bandwidth can be found in the FOTP 220 standard (TIA-455-220-A, January 2003), while bandwidth measured over overfilled launch condition is described in IEC 66793-1-41 (FOTP-204, TIA-455-204-A, October 2013), both being incorporated herein by reference.

In order to minimize modal dispersion, the multimode optical fibers used in data communications generally comprise a core, generally doped with Germanium, and showing a refractive index that decreases progressively going from the center of the fiber to its junction with a cladding. In general, the index profile is given by a relationship known as the "a profile", as follows:

$$n(r) = n_{core}\sqrt{1 - 2\Delta_{core}\left(\frac{r}{R_{core}}\right)^\alpha} \text{ for } r \leq R_{core},$$

where:

$n_{core}$ is a refractive index on an optical axis of a fiber;
r is a distance from said optical axis;
$R_{core}$ is a radius of the core of said fiber;
$\Delta_{core}$ is a non-dimensional parameter, indicative of an index difference between the core and a cladding of the fiber; and
α is a non-dimensional parameter, indicative of a shape of the index profile.

When a light signal propagates in such a core having a graded index, the different modes experience a different propagation medium, which affects their speed of propagation differently. By adjusting the value of the parameter a, it is thus possible to theoretically obtain a group velocity, which is virtually equal for all the modes and thus a reduced intermodal dispersion for a particular wavelength.

In practice, however, multimode fibers are manufactured with a graded index central core surrounded by an outer cladding of constant refractive index. Thus, the core of the multimode fiber never corresponds to a theoretically perfect alpha profile, because the interface of the core (having an alpha profile) with the outer cladding (having a constant refractive index) interrupts the alpha profile. The outer cladding accelerates the higher order modes compared to the lower order modes and some differences of time delay appear within the highest order mode groups. This phenomenon is known as the cladding effect. In DMD measurement the responses acquired for the highest radial positions (i.e. nearest the outer cladding) exhibit multiple pulses, which results in a temporal spreading of the response signal. Therefore bandwidth is diminished by this cladding effect.

Graded-index alpha-shape profile and core-cladding interface of the multimode fibers are optimized to operate with GaAs VCSELs that can be directly current-modulated to support 10 Gbps and 25 Gbps systems at 850 nm. Backwards compatibility for use at 1300 nm with LED sources is also guaranteed for most of the 50 μm and 62.5 μm multimode fibers currently in use. The performances of such laser-optimized, high bandwidth 50 μm multimode fibers, also called OM4 fibers, have been standardized by the International Standardization Organization in document ISO/IEC 11801, as well as in TIA/EIA 492AAAD standard (October 2009).

However, the explosion in demand for bandwidth in enterprise networks is driving an urgent need for higher Ethernet network speeds. To further increase the data bit rate for next generation 400 GbE systems, the use of InGaAs VCSELs operating at 40-56 Gb/s around 1060 nm appears as a promising solution, as it will allow achieving higher speed with higher reliability, lower operating temperature and lower cost of the VCSELs. Furthermore, at this wavelength, the fiber exhibits lower attenuation, lower chromatic dispersion and higher potential modal bandwidth because of fewer modal groups if the graded-index alpha-shape profile is optimized to operate at this specific wavelength.

While such VCSELs can be proposed now for high-speed applications, fibers optimized for these VCSELs operating at wavelength greater than 950 nm are missing.

Moreover, operating at wavelengths larger than 850 nm has the drawback of degrading macrobend performance of the optical fibers.

The skilled person knows that adding a region of depressed refractive index, called a trench, in the cladding allows bend losses to be reduced, by improving the confinement of the optical modes within the core. Moreover, the larger the volume of the trench, the lower the bend losses. However, if the trench volume is too large and if the interface between the core and the trench is not properly designed, the trench penalizes bandwidths performance, all the more so at longer wavelengths: this can jeopardize backward compatibility of the optical fiber at 1300 nm.

The skilled person also knows well that adapting the alpha-shape profile and the core-cladding interface to the operating wavelength can reduce the inter-modal dispersion. However, the rules of design, which each manufacturer may have developed for bend-insensitive 50 µm multimode fibers operating at 850 nm, cannot be adapted only by changing the alpha-value of the graded-index core, in order to design multimode fibers optimized for operation at, or around, 1060 nm.

At wavelengths longer than 850 nm, and notably around 1060 nm, because of fewer modal groups, the proportion of modal groups directly affected by the core-cladding geometry and by the trench is larger. Thus, its optimization is more delicate and its impact on the total bandwidth is increased.

A solution to improve bend losses at 1060 nm consists in designing fibers with smaller core diameters, typically smaller than 48 µm. However, in the same manner, with small core radius, because of fewer modal groups, impact of core-cladding geometry on the total bandwidth is increased too. Moreover, the drawback of optical fibers with smaller core radii lies in higher insertion losses when standard 50 µm multimode fibers patch cords are used, or when they must be connected with standard 50 µm multimode fibers.

Patent document WO 2015/126895 describes a multimode optical fiber operating over an extended wavelength range: it comprises a graded index glass core with refractive index Δ1, a maximum refractive index delta Δ1MAX, and a core radius between 11 and 23.75 microns, and a cladding region surrounding the core comprising refractive index Δ4. The multimode optical fiber exhibits an overfilled bandwidth of at least 3 GHz·km at a wavelength of 850 nm and an overfilled bandwidth of at least 1.2 GHz·km at one or more wavelengths between 980 and 1060 nm.

The exemplary embodiments provided in this prior art document show that low values of Numerical Aperture and core diameters allow the multimode optical fibers to achieve sufficiently high bandwidths. However, as stated above, small core radii tend to increase the insertion losses when two fibers must be connected together. When such fibers need to be connected together, their small core radii make them more sensible to radial offsets.

It would be hence desirable to provide a multimode optical fiber showing improved performance as regards connection losses, as compared to this prior art document.

Patent document WO 2013/181182 describes the features of one exemplary multimode optical fiber for use for wavelength division multiplexing in the 1310 nm and/or the 1550 nm window. It includes a graded index glass core having a diameter in the range of 41 microns to 80 microns, a graded index having an alpha less than 2.04 and a maximum relative refractive index in the range between 0.6% and 1.8%. The cladding includes a depressed-index annular portion. The fiber has an overfilled bandwidth greater than 2.5 GHz·km at at least one wavelength between 1200 nm and 1700 nm.

It would be desirable to provide a multimode optical fiber showing improvements over the prior art and, notably, optimized for transport of high bitrates (40-56 Gb/s) generated by InGaAs VCSELs operating around 1060 nm.

3. SUMMARY

According to some embodiments, a multimode optical fiber comprises an optical core and an outer optical cladding surrounding the optical core, the optical core having an α graded-index profile with α≥1, α being a non-dimensional parameter that defines the index profile shape of the optical core, and the optical core having a maximal refractive index $n_{core}$ at its center and an outer radius $R_{core}$. The optical cladding has at its outer edge a refractive index $n_{Cl}$, and comprises a region of depressed refractive index $n_{trench}$, called a trench, with a negative refractive index difference $Dn_t = n_{trench} - n_{Cl}$ with respect to said optical cladding, the trench having a width $w_3$. The optical cladding also comprises a region of intermediate cladding, with a refractive index difference $Dn_2$ with respect to the optical cladding, the intermediate cladding having a width $w_2$, and being located between, and in contact with, the optical core and the trench.

Such a multimode optical fiber has a mode carrying capacity supporting propagation of at least fifty-four and at maximum sixty-eight LP modes at an operating wavelength $\lambda_{op}$ comprised between 1050 nm and 1070 nm, such mode carrying capacity being defined by a specific relationship between the numeral aperture of the core $NA=\sqrt{(n_{core}^2-n_{Cl}^2)}$ and the core outer radius $R_{core}$.

Moreover, the optical core, intermediate cladding and trench satisfy the criterion $Cg_{int}<0.25$, where:

$$Cg_{int} = |1000 Dn_2 - 3.00 + 2.21 w_2 + 0.290 w_3 + 0.365(V_t/\Delta_{core})| + 0.12(R_{core}-25)^4$$

with $R_{core}$, $w_2$ and $w_3$ expressed in microns,
$V_t = \pi\{(R_{core}+w_2+w_3)^2 - (R_{core}+w_2)^2\}*Dn_t$ a volume of said trench expressed in $\mu m^2$, $$Dn_t > -5.5 \times 10^{-3},$$

$$\Delta_{core} = \frac{(n_{core}^2 - n_{Cl}^2)}{2n_{core}^2} \text{ expressed in \%,}$$

and $Dn_2$, $Dn_t$ and $\Delta_{core}$ measured at a wavelength $\lambda=633$ nm, The optical core has an outer radius 24 µm≤$R_{core}$≤26 µm, a numerical aperture NA between 0.190 and 0.225 at said operating wavelength $\lambda_{op}$ comprised between 1050 nm and 1070 nm, and a value of α between 2.01 and 2.05.

The present invention thus relies on a novel and inventive approach of multimode optical fibers. Actually, it offers a multimode optical fiber adapted to high-speed applications using VCSEL emitting light at 1060 nm, with an optimized core-cladding geometry, and which achieves low insertion loss, low bend losses, and large Overfilled Launch Bandwidth, both around 1060 nm and at 1300 nm.

More precisely, such a multimode optical fiber has an important mode carrying capacity between fifty-four and sixty-eight LP modes at the operating wavelength $\lambda_{op}$ around 1060 nm, which is defined by a specific relationship between the numerical aperture of the core and the core outer radius, as given by equation Eq. 1:

$$54 \leq \left| \left( 0.0079 * \left( \frac{R_{core}*NA}{\lambda} \right)^2 + 0.82 \right) * \left[ \frac{\left( \frac{R_{core}*NA}{\lambda} \right)^2 + 10.1}{3} \right] * 6 - 10 \right| \leq 68 \quad \text{(Eq. 1)}$$

where $NA=\sqrt{(n_{core}^2-n_{Cl}^2)}$ is the Numerical Aperture of said optical core at said operating wavelength $\lambda_{op}$ and where the notation ⌊x⌋ stand for the floor function, i.e. the largest integer less than or equal to x. The number of supported LP modes is defined as the number of LP modes guided in the fiber with an effective index difference $Dn_{eff}$ (with respect to the cladding index) greater than 0.001 ($Dn_{eff}$>0.001) at the operating wavelength $\lambda_{op}$.

Such a multimode optical fiber also meets a specific criterion $Cg_{int}$<0.25, where $Cg_{int}$ offers a defined relationship between the trench, core and intermediate cladding parameters to achieve a high bandwidth and low bend-loss around 1060 nm. Actually, the multimode optical fiber comprises a depressed trench, which allows the macrobending losses to be decreased, by improving the confinement of the optical modes within the core.

Last, such a multimode fiber has values of the core radius, numerical aperture of the core and alpha parameter of the graded-index profile, which allow this fiber to retain compatibility with legacy fibers.

According to some embodiments, the volume of the trench $V_t$ is comprised between −5.40 μm² and −3.30 μm², and preferably between −5.40 μm² and −3.60 μm². A trench volume larger than 3.60 μm² in absolute value guarantees bend losses smaller than 0.2 dB after two turns of 7.5 mm bend radius. A trench volume limited to 5.40 μm² in absolute value limits leaky modes.

According to some embodiments, the multimode optical fiber has a mode carrying capacity supporting propagation of at least fifty-six and at maximum sixty-four LP modes at an operating wavelength $\lambda_{op}$ comprised between 1050 nm and 1070 nm, said mode carrying capacity being defined by the relationship:

$$56 \leq \left\lfloor \left( 0.0079 * \left( \frac{R_{core} * NA}{\lambda} \right)^2 + 0.82 \right) * \left\lfloor \frac{\left( \frac{R_{core} * NA}{\lambda} \right)^2 + 10.1}{3} \right\rfloor * 6 - 10 \right\rfloor \leq 64 \quad \text{(Eq. 2)}$$

According to some embodiments, the refractive index difference of the trench is such that $Dn_t$<−2×10⁻³.

According to some embodiments, at said operating wavelength $\lambda_{op}$ comprised between 1050 nm and 1070 nm, said multimode optical fiber has an overfilled launch bandwidth (OFL-BW) greater than 5000 MHz·km.

According to some embodiments, at a wavelength λ=1300 nm, said multimode optical fiber has an overfilled launch bandwidth (OFL-BW) greater than 850 MHz·km.

According to some embodiments, at said operating wavelength $\lambda_{op}$ around 1060 nm, said multimode optical fiber has macrobending losses Max|BL|<0.2 dB for two turns at 7.5 mm bend radius, where BL are the bend losses of different guided modes in said optical fiber, and where Max|BL| is the absolute maximum value of BL for all guided modes.

Embodiments of the present disclosure also concern a multimode optical system comprising at least a portion of a multimode optical fiber as previously described.

According to some embodiments, such an optical system presents a data bit rate greater than or equal to 10 Gb/s over 100 m, preferably greater than or equal to 10 Gb/s over 300 m.

According to some embodiments, such an optical system presents a data bit rate greater than or equal to 25 Gb/s over 100 m. According to some embodiments, such an optical system presents a data bit rate greater than or equal to 50 Gb/s over 50 m.

According to some embodiments, such an optical system also comprises at least a portion of another multimode optical fiber as previously described, and, when said at least two portions are connected to each other with a radial offset between their optical axis smaller than or equal to two microns, the connection loss between said at least two portions is smaller than 0.25 dB at said operating wavelength $\lambda_{op}$ around 1060 nm.

4. BRIEF DESCRIPTION OF THE DRAWINGS

The present disclosure can be better understood with reference to the following description and drawings, given by way of example and not limiting the scope of protection, and in which:

FIG. 1 schematically depicts an isometric view of an exemplary multimode optical fiber according to one or more embodiments described herein;

FIG. 2 graphically provides the illustrative refractive index profile of multimode optical fibers according to embodiments of the present disclosure;

Figure 1:
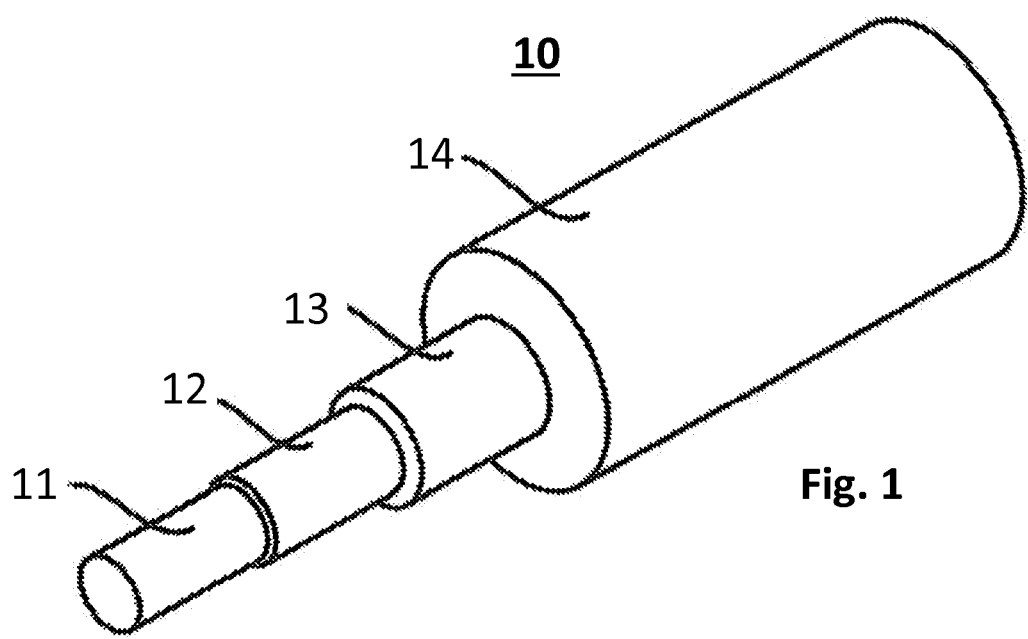

The components in the figures are not necessarily to scale, emphasis instead being placed upon illustrating the principles of the invention.

5. DETAILED DESCRIPTION

The general principle of the present disclosure is to provide a carefully designed trench-assisted graded index multimode optical fiber, optimized for transport of high bitrates generated by InGaAs VCSELs operating at 1060 nm, supporting 54 to 68 LP modes and achieving both a high bandwidth and low bend loss around 1060 nm, while retaining compatibility with legacy fibers. More precisely, the purpose of such a design is to optimize the interface between the graded-index core and the trench, in order to increase the number of supported LP modes up to 54 or more, while keeping the bend loss of any LP guided modes low, preferably below 0.2 dB for two turns at 7.5 mm bend radius.

It is recalled that light travelling in an optical fiber actually forms hybrid-type modes, which are usually referred to as LP (linear polarization) modes. The $LP_{0p}$ modes have two polarization degrees of freedom and are two-fold degenerate, the $LP_{mp}$ modes with m≥1 are four-fold degenerate. These degeneracies are not counted when designating the number of LP modes propagating in the fiber.

Reference will now be made in detail to embodiments of multimode optical fibers, examples of which are illustrated in the accompanying drawings. Whenever possible, the same reference numerals will be used throughout the drawings to refer to the same or like parts.

One embodiment of a multimode optical fiber according to the present disclosure is schematically depicted in isometric view in FIG. 1. The optical fiber 10 generally has a glass core 11 surrounded by a glass cladding. More precisely, the optical fiber 10 comprises four abutting concentric regions, namely:
  a graded-index core 11, with an outer radius $R_{core}$;
  an intermediate cladding 12, with an inner radius $R_{core}$, a width $w_2$ and hence an outer radius $R_{core}+w_2$;
  a trench 13, with a width $w_3$ and hence an outer radius $R_{core}+w_2+w_3$;
  an outer cladding 14, with a refractive index $n_{Cl}$.

In embodiments of the present disclosure, the glass core 11 generally has a radius $R_{core}$ at zero refractive index difference (i.e. $n(R_{core})=n_{Cl}$) from about 24 µm to about 26 µm. In the embodiments shown and described herein, the core 11 and the cladding generally comprise silica, specifically silica glass. The cross-section of the optical fiber 10 may be generally circular-symmetric with respect to the center of the core 11. In some embodiments described herein, the radius of the glass portion of the optical fiber 10 is about 62.5 µm. However, it should be understood that the dimensions of the cladding may be adjusted such that the outer radius of the cladding may be greater than or less than 62.5 µm. The optical fiber 10 also comprises a coating surrounding the cladding. Such a coating may comprise several layers, and it may notably be a dual-layer coating, although these different layers are not shown on FIG. 1.

The different portions in the cladding may comprise pure silica glass ($SiO_2$), silica glass with one or more dopants, which increase the index of refraction (e.g. $GeO_2$ or any other known dopant), such as when the portion of the cladding is "up-doped" (e.g. for the intermediate cladding 12), or silica glass with a dopant, which decreases the index of refraction, such as fluorine, such as when the portion of the cladding is "down-doped" (e.g. for the trench 13).

Although not illustrated on FIG. 1, the outer cladding 14 may also comprise other portions or layers of lower or higher refractive indexes.

Figure 2:
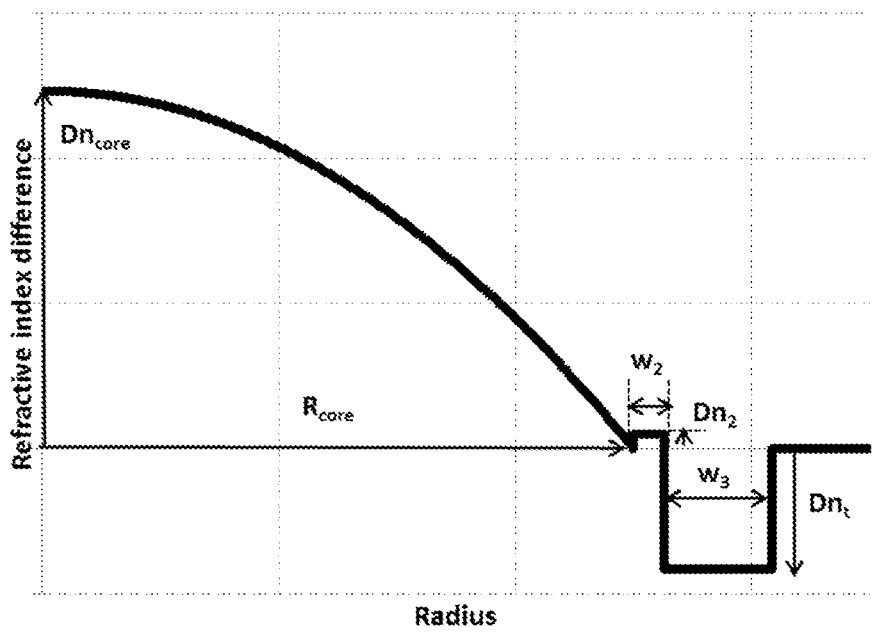

FIG. 2 depicts the refractive index profile n(r) of optical fiber 10 according to an embodiment of the present disclosure. It describes the relationship between the refractive index value n and the distance r from the center of the optical fiber. The x-axis represents radial position with x=0 representing the center of the core region, and the y-axis represents refractive index, expressed as an index difference Dn unless otherwise stated. Throughout this document, refractive index differences are determined at λ=633 nm, corresponding to the calibrated wavelength of an equipment used to assess the features of fiber preforms.

In this embodiment, the optical fiber 10 has an optical core 11 having a refractive index profile n(r) defined as follows:

$$n(r) = n_{core}\sqrt{1 - 2\Delta_{core}\left(\frac{r}{R_{core}}\right)^\alpha}, r \leq R_{core},$$

where:
  r is a variable representative of the radius of the optical fiber,
  $R_{core}$ is the optical core outer radius,
  $\Delta_{core}$ is the normalized refractive index difference of the optical core, with $$\Delta_{core} = \frac{(n_{core}^2 - n_{Cl}^2)}{2n_{core}^2}$$

$n_{Cl}$ is the minimal refractive index of the optical core, corresponding to the refractive index of the optical cladding,
  $n_{core}$ is the maximal refractive index of the optical core,
  α is a non-dimensional parameter that defines the index profile shape of the optical core.

The alpha refractive index profile of the optical core 11 allows reducing intermodal dispersion of the optical fiber 10. The optical core 11 has a radius $R_{core}$, at which the refractive index difference of the core with respect to the cladding is equal to zero, as $n(R_{core})=n_{Cl}$, with $n_{Cl}$ the refractive index of the outer cladding. The optical core 11 also has a maximum refractive index difference with the outer cladding 14 $Dn_{core}=n_{core}-n_{Cl}$.

The optical core 11 is directly surrounded by an optical cladding, which comprises an intermediate cladding 12, with width $w_2$, a depressed-index ring 13, also called a trench, with width $w_3$, and an outer cladding layer 14. In some embodiments such an outer cladding layer 14 comprises pure silica glass ($SiO_2$) and its refractive index $n_{Cl}$ is hence that of silica glass.

The intermediate cladding 12 has a refractive index difference $Dn_2$ with respect to the refractive index of the outer cladding, and the trench 13 has a negative refractive index difference $Dn_t=n_{trench}-n_{Cl}$ with respect to the refractive index of the outer cladding. Their position and size are designed so as to lower loss of connection and improve bend-loss resistance of the fiber, as well as high bandwidth at both 1060 nm and 1300 nm, as will appear in greater details below.

Figure 3:
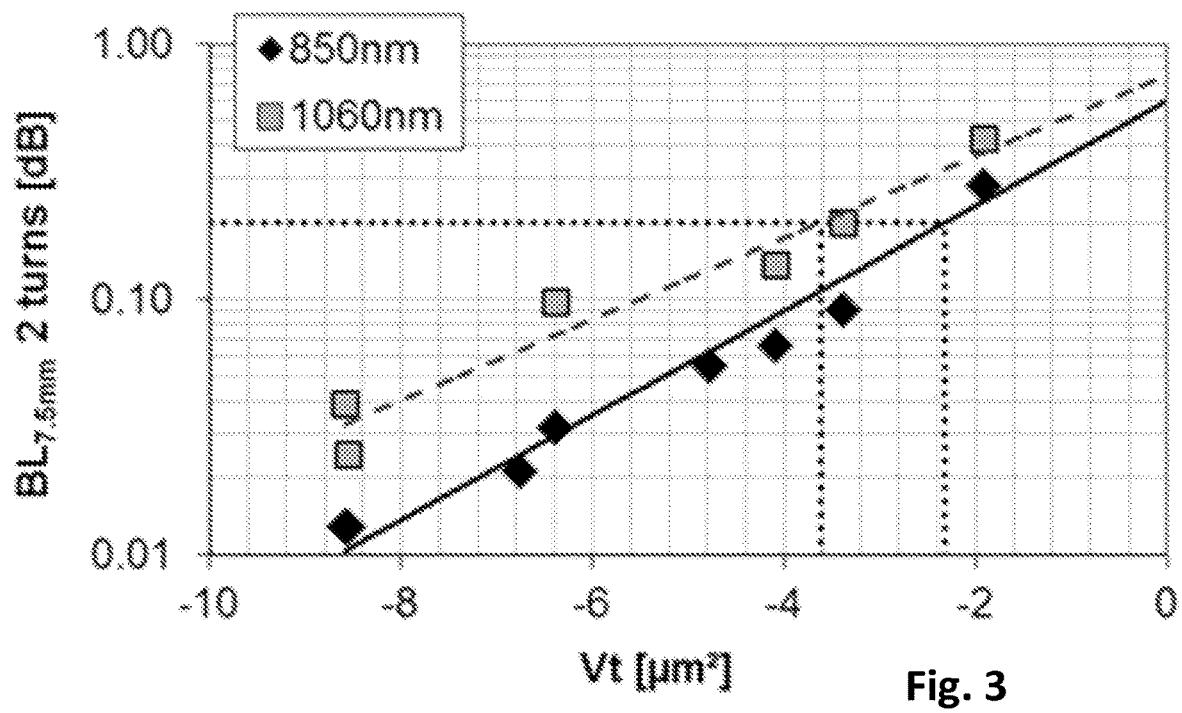
FIG. 3 illustrates the bending loss for two turns of 7.5 mm bending radius as a function of a trench volume $V_t$ for various 50 μm multimode optical fibers.

FIG. 3 illustrates the bending loss for two turns of 7.5 mm bending radius as a function of a trench volume $V_t$ for various 50 µm multimode optical fibers with a core diameter between 47 and 53 µm, and a numerical aperture NA= $\sqrt{(n_{core}^2 - n_{Cl}^2)}$ of the optical core between 0.185 and 0.215. On FIG. 3, a continuous line links the data collected at a wavelength λ=850 nm, while a dashed line links the data collected at a wavelength λ=1060 nm.

The data illustrated on FIG. 3 are collected according to measurements complying with the requirements of the ISO IEC 60793-1-47 (Edition 3.0, 2009) describing measurement procedure of macrobending losses for optical fibers, which is herein incorporated by reference.

The launch conditions for the macrobending loss measurement fulfill that described in ISO IEC 61280-4-1 (Edition 2.0, 2009) (herein incorporated by reference) describing launch condition requirements for optical attenuation using sources with a controlled encircled flux (EF). EF is the fraction of cumulative near-field power to the total output power as a function of radial distance from the optical center of the core. A target EF value for a set of particular radial control points is defined. Upper and lower limit of EF values for a set of particular radial control points may also be defined. A compliant launch is a launch that falls within the template at the particular radial control points.

Specifications of 50 µm bend-insensitive-MMF optimized to operate at 850 nm (namely A1a.1b and A1a.3b fibers) are described in IEC 60793-2-10 (Edition 5.0, 2015), which is also herein incorporated by reference. Required macrobending losses are respectively 0.5 dB for 100 turns with 37.5 mm bending radius, 0.1 dB for two turns with 15 mm radius and 0.2 dB for two turns with 7.5 mm radius. The most discriminant condition being the bend loss level obtained for 7.5 mm radius, we consider that the same bending loss levels must be targeted at 1060 nm if we want to design bend-insensitive MMF optimized to operate around 1060 nm, i.e. 0.2 dB for two turns of 7.5 mm radius.

According to the structure and the refractive index profile of the multimode optical fibers of FIGS. 1 and 2, the volume of the trench $V_t$ may be expressed in $µm^2$ as:

$$V_t = \pi\{(R_{core}+w_2+w_3)^2-(R_{core}+w_2)^2\}*Dn_t.$$

As may be observed on FIG. 3, maintaining bending loss lower than 0.2 dB at an operating wavelength $\lambda$=1060 nm requires to increase the volume of the trench $V_t$ by more than 60%, as compared to the volume of the trench $V_t$ required at 850 nm.

According to embodiments of the present disclosure, the trench volume $V_t$ is set to be larger than 3.30 $µm^2$ in absolute value to guarantee bending loss lower than 0.3 dB at 1060 nm after two turns with 7.5 mm bending radius, and preferentially larger than 3.60 $µm^2$ to guarantee bending loss lower than 0.2 dB at 1060 nm after two turns with 7.5 mm bending radius.

Although the depressed trench 13 typically improves the bend resistance of the guided modes, it also allows additional modes, called "leaky modes," to co-propagate with the desired guided modes. These leaky modes exhibit additional losses, called "leakage losses." Typically, wider depressed trenches reduce the leakage losses of the leaky modes. In addition, the deeper the depressed trench (i.e., in terms of absolute value, the bigger the negative refractive index difference of the depressed trench with respect to the outer cladding), the greater the number of leaky modes. Leaky modes are also present within a regular MMF (i.e., an MMF without any significant improvement in bend resistance), but the existence of the leaky modes is disregarded in practice, because the level of their leakage losses is extremely high.

These additional leaky modes have effective refractive indices, which are lower than those sustained by the graded-index core. This leads to an increase in the numerical aperture measured on 2 m by the far field pattern in the graded-index fibers comprising a depressed trench, in comparison with the numerical aperture measured in the graded-index fibers without a depressed trench according to the well-known standardized IEC 60793-1-43 (Edition 2.0, 2015) method (incorporated herein by reference). In addition, the leaky modes can contribute to corrupt the core size derived from the near field pattern measured under overfilled launch (OFL) at the output of a 2 m long sample with IEC 60793-1-20 (Edition 2.0, 2014) Method C (incorporated herein by reference). Core size with trench can look larger than expected by its graded-index core width.

Corrupted numerical aperture and core size measurements may lead to wrong conclusions regarding the core size and the value $Dn_{core}$ of the refractive index profile, which are of main importance for connectivity purpose because they determine the number and the shape of the guided modes. Such a difference in number and in shape of the guided modes between two different graded-index fibers can lead to mode mismatching and therefore to high splice losses or connectivity losses.

Figure 4A:
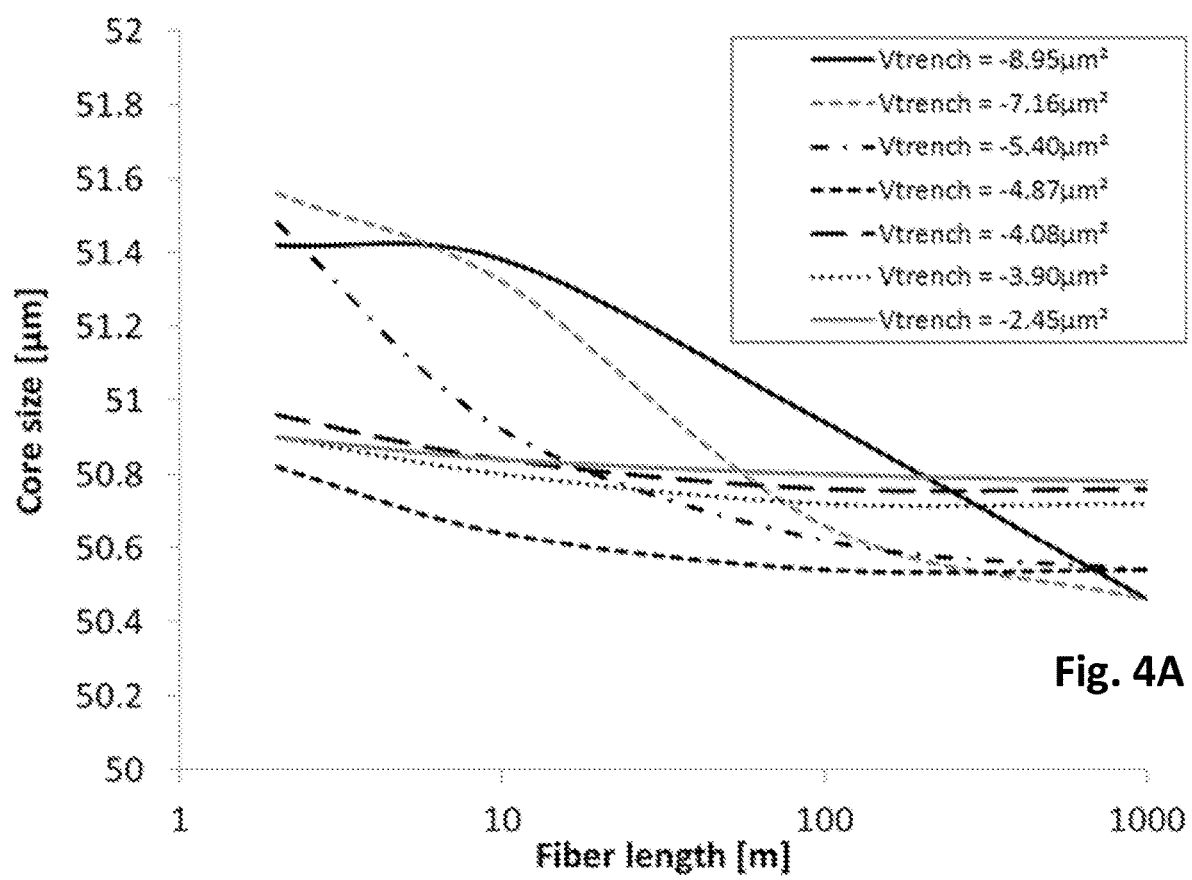
FIG. 4A represents modeling results of core size of MMF optical fibers as a function of the fiber length for various trench volumes.
Figure 4B:
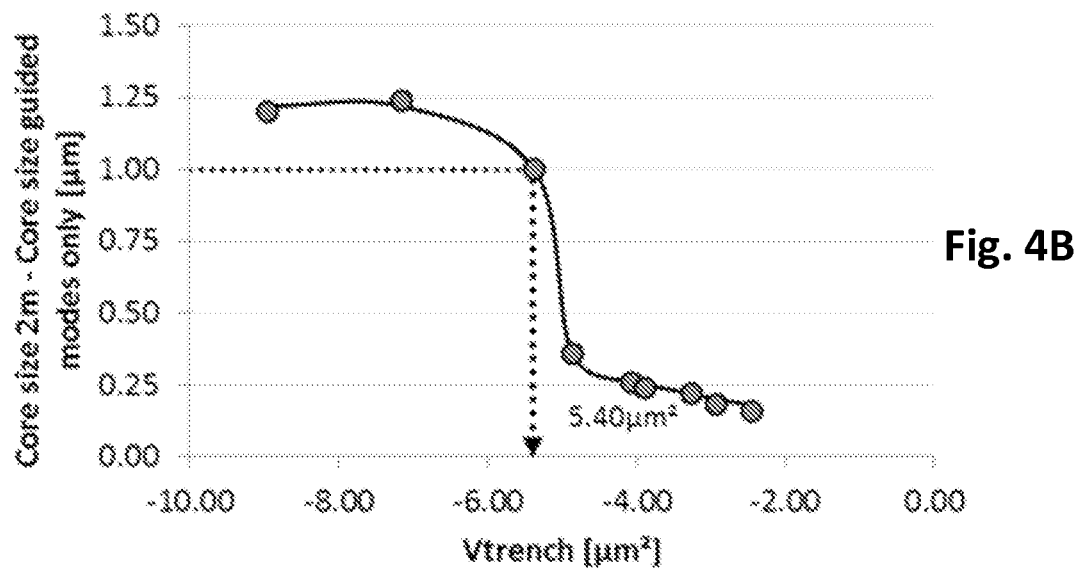
FIG. 4B represents the difference between core size derived from the near field pattern resulting from the presence of guided and leaky-modes after 2 m of optical fiber length and core size calculated with guided modes only, as a function of the trench volume.

As an illustration, FIG. 4A represents modeling results of core size derived using IEC 60793-1-20 Method C, without curve fitting, directly from the measured pattern at the level k=2.5% (where k is the threshold used for defining the core radius) at 1060 nm after different fiber lengths (from 2 m to 1000 m) of different MMFs with $R_{core}$=25 µm, $\Delta_{core}$=1% and various trench volumes $V_t$, also noted $V_{trench}$. The larger (in absolute value) the volume of the trench $V_t$, the longer the length, which is necessary to reach a stabilized core size and get rid of leaky-mode corruption. FIG. 4B represents the difference between core size derived from the near field pattern resulting from the presence of guided and leaky-modes after 2 m and core size calculated with guided modes only. As may be observed on FIG. 4B, −5.40 $µm^2$ is found to be the maximum volume for $V_t=V_{trench}$ to limit the core size overestimation to 1.0 µm.

As a consequence, according to embodiments of the present disclosure, and in order to limit leaky modes, the volume of the trench 13 $V_t$ is limited to 5.40 $µm^2$ in absolute value.

Moreover, according to embodiments of the present disclosure, and in order to limit bend losses, the maximum optical core outer radius is preferentially limited to $R_{core} \leq 26$ µm.

The careful design of the multimode optical fiber according to embodiments of the present disclosure also aims at achieving small insertion loss, when two multimode fibers are connected together.

Figure 5:
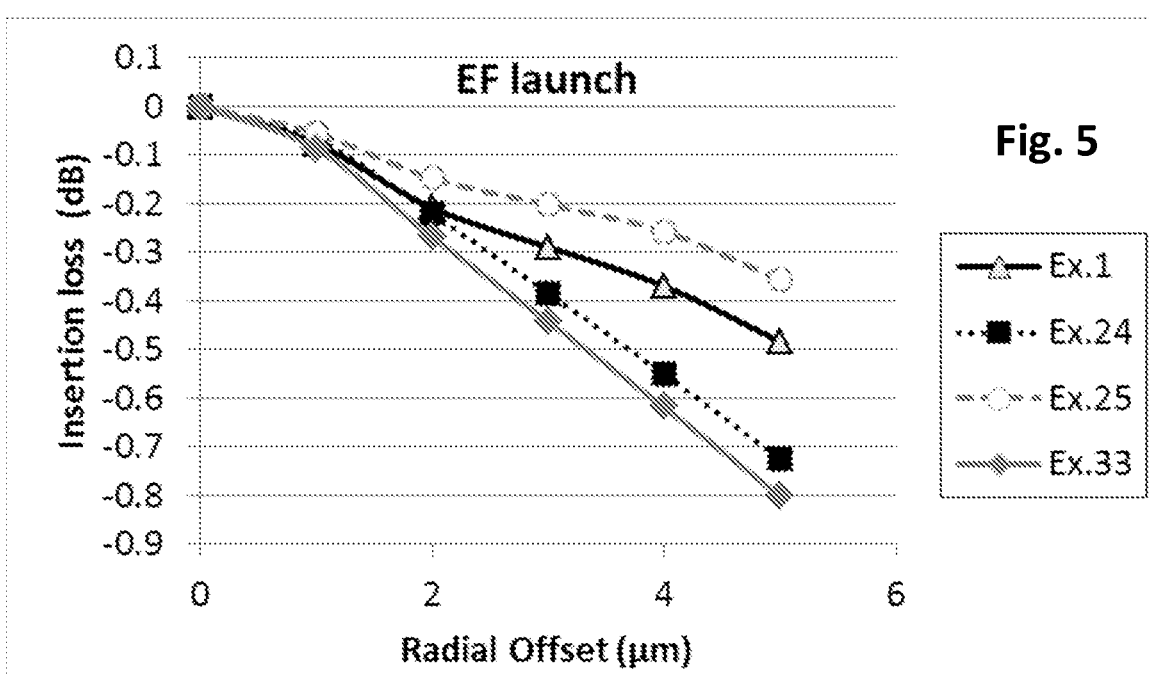
FIG. 5 illustrates the insertion loss at an operating wavelength $\lambda_{op}$=1060 nm between two identical MMF optical fibers as a function of the radial offset at connection between the optical axis of both fibers for four exemplary fibers.

FIG. 5 illustrates the insertion loss at an operating wavelength $\lambda_{op}$=1060 nm between two identical MMF optical fibers as a function of the radial offset at connection between the optical axis of both fibers for four exemplary fibers (namely, exemplary fibers corresponding to examples Ex. 1, Ex. 24, Ex. 25 and Ex. 33, which features and parameters are detailed below in Tables 2 and 3). Mandrel settings have been adjusted to guarantee an EF (for Encircled Flux) launch in the first fiber according to the IEC61280-4-1 (Edition 2.0, 2009) template (incorporated herein by reference) at 850 nm, but applied at 1060 nm (it must be noted that the launch condition at 1060 nm are not standardized yet). Actually, like for macrobending loss measurements previously described in relation to FIG. 3, the launching conditions defined in the IEC 61280-4-1 standard, which describe launch condition requirements for optical attenuation using sources with a controlled encircled flux (EF), are applied at an operating wavelength $\lambda_{op}$=1060 nm.

The exemplary fiber of example Ex. 1 has a core radius of 25 µm; the exemplary fiber of example Ex. 24 has a core radius of 24.2 µm; the exemplary fiber of example Ex. 25 has a core radius of 26 µm; and the exemplary fiber of example Ex. 33 has a core radius of 23.75 µm.

As may be observed on FIG. 5, the smaller core radii of exemplary fibers Ex. 24 and Ex. 33 induce important insertion losses when the radial offset between both connected fibers is important. More generally, the smaller the core radius is, the more sensitive to radial offset the connection (or insertion) loss is. With a 2 µm offset between the optical axes of the connected MMF fibers, insertion loss varies from 0.15 dB to 0.27 dB for an optical core radius varying from 26 µm to 23.75 µm.

Such a phenomena is further enhanced when considering a more realistic case, consisting for example in connecting two optical fibers of the same type, but with core radius varying according to a normal distribution with a standard deviation σ=0.5 μm and minimum and maximum values at +/−1 μm around the nominal value.

TABLE 1

| Radial Offset = 2 μm Fiber type | Nominal R$_{core}$ with σ = 0.5 μm and min/max values +/− 1 μm (μm) | Ratio of links with insertion loss >0.30 dB (%) |
| --- | --- | --- |
| Ex. 1 | 25.00 | 13 |
| Ex. 24 | 24.20 | 11 |
| Ex. 25 | 26.00 | 2 |
| Ex. 33 | 23.75 | 27 |

We consider a connection of two optical fibers of the same type, with a radial offset between the optical axes of both fibers of 2 μm. The first column of Table 1 indicates the type of optical fibers (among exemplary fibers Ex. 1, Ex. 24, Ex. 25 and Ex. 33). The second column of Table 1 gives the nominal value of the optical core radius R$_{core}$ for each type of fiber. We consider that the core radius varies according to a normal distribution around this nominal value, with a standard deviation σ=0.5 μm and minimum and maximum values at +/−1 μm around the nominal value. Many optical links are built by concatenating any two fibers of a same type. The third column of Table 1 gives, for a given type of optical fibers (namely Ex. 1, Ex. 24, Ex. 25 and Ex. 33), the ratio of links showing insertion losses greater than 0.30 dB.

As may be observed, 27% of the optical links, made by connecting two multimode optical fibers of an Ex. 33 type, show insertion loss greater than 0.30 dB, which appears to be a too important ratio.

As a consequence, and in order to limit insertion loss when connecting fibers together, the minimum optical core radius R$_{core}$ according to embodiments of the present disclosure is preferably limited to 24 μm.

As already discussed, adding a trench of depressed refractive index in the cladding of a multimode optical fiber allows reducing macrobending losses. However, for a given trench volume V$_t$, and even with an optimized intermediate cladding between the optical core and the trench, a deeper trench tends to deteriorate the OverFilled Launch Bandwidth (OFL-BW) of the multimode fiber. In other words, setting minimum and maximum values for the trench is not enough for an optimized and careful design of the multimode optical fiber: it is also important to set the depth (and, as a consequence, width) of the trench.

Overfilled Launch Bandwidth measurement (OFL-BW) is standardized in IEC 60793-1-41 (FOTP-204, TIA-455-204-A, October 2013), which is incorporated herein by reference. It is recalled that OFL-BW is the originally standardized fiber bandwidth measurement method where the source launches light uniformly into all modes of the multimode fiber. The launch condition of this measurement is similar to that of an LED source. Therefore this measurement method gives a good indication of system performance when using legacy protocols utilizing LED sources. Furthermore, all the modes of the fiber being excited, OFL-BW measurements allows fibers having the same graded-index core but different core-cladding geometries to be differentiated, the higher order modes being strongly dependent on the core-cladding geometry.

Figure 6:
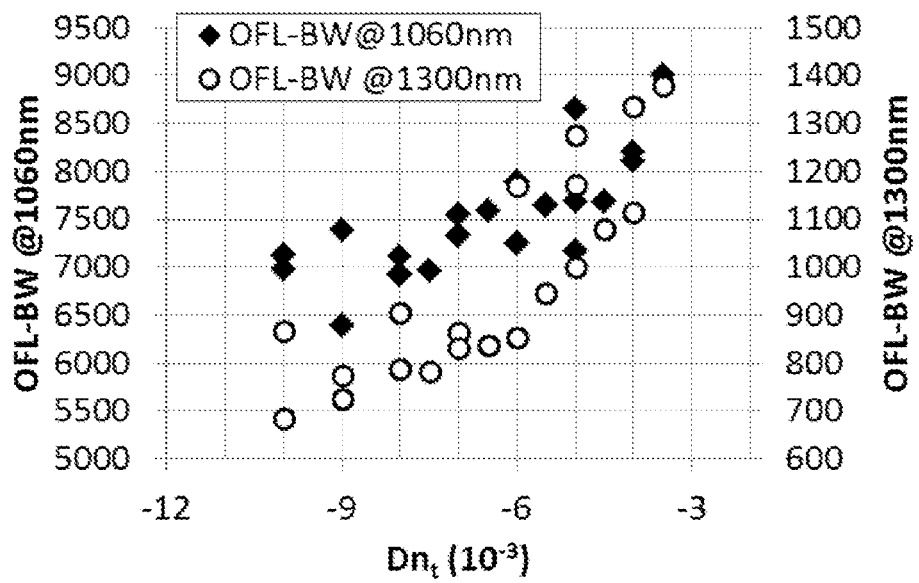
FIG. 6 illustrates the OFL bandwidth of different multimode optical fibers, expressed in MHz·km, both at 1060 nm and 1300 nm, as a function of the depth of the trench.

FIG. 6 illustrates the OFL bandwidth of different multimode optical fibers, expressed in MHz·km, both at 1060 nm (left Y-axis) and 1300 nm (right Y-axis), as a function of the depth of the trench Dn$_t$=n$_{trench}$−n$_{Cl}$ (X-axis, expressed in 10$^{-3}$). The MMF fibers used for the measurements of FIG. 6 show the refractive index profile of FIG. 1, and have a core radius R$_{core}$=25 μm, a relative refractive index of the core Δ$_{core}$=1%, a trench volume V$_t$=−4.08 μm² (corresponding to a roughly median value between the upper limit V$_t$=−3.30 μm² and the lower limit V$_t$=−5.40 μm² set for embodiments of the present disclosure) and an intermediate cladding (in terms of width w$_2$ and depth Dn$_2$) optimized to maximize the total bandwidth.

Following the results of FIG. 6, according to embodiments of the present disclosure, the negative refractive index difference of the trench Dn$_t$, i.e. the depth of the trench, is limited to Dn$_{t\ min}$=−5.5×10$^{-3}$, which guarantees an OFL-BW at 1300 nm around 1000 MHz·km, and an OFL-BW at 1060 nm around 7000 MHz·km.

Last, according to embodiments of the present disclosure, the intermediate cladding of depth Dn$_2$ and width w$_2$ is optimized so that a criterion Cg$_{int}$ linked to the geometry of the core/cladding interface satisfies:

$$Cg_{int}=|1000Dn_2-3.00+2.21w_2+0.290w_3+0.365(V_t/\Delta_{core})|+0.12(R_{core}-25)^4<0.25$$

with Dn$_2$ the refractive index difference of the intermediate cladding with the outer cladding at a wavelength of 633 nm, Dn$_t$ the refractive index difference of the trench with the outer cladding at a wavelength of 633 nm, Δ$_{core}$ the core index in % at a wavelength of 633 nm and w$_2$ and w$_3$ the width in microns of the inner cladding and of the trench, respectively.

According to embodiments of the present disclosure, the optical core outer radius R$_{core}$ and the numerical aperture of the core NA=$\sqrt{(n_{core}^2-n_{Cl}^2)}$ at an operating wavelength λ$_{op}$ of 1060 nm+/−10 nm are chosen according to the formula of equation Eq. 1, which gives the number of LP modes with effective index difference Dn$_{eff}$>0.001 supported by the fiber at a given wavelength λ, so that:

$$54 \leq \left[\left(0.0079*\left(\frac{R_{core}*NA}{\lambda}\right)^2+0.82\right)*\left(\left[\frac{\left(\frac{R_{core}*NA}{\lambda}\right)^2+10.1}{3}\right]*6-10\right)\right] \leq 68 \quad (Eq.\ 1)$$

Table 2 below summarizes the features of twenty-five exemplary fibers (named Ex. 1 to Ex. 25) corresponding to embodiments of the present disclosure, namely:

the first column gives the reference of the exemplary fiber, from Ex. 1 to Ex. 25;

the second column gives the optical core outer radius R$_{core}$ expressed in microns, and comprised between R$_{core}$=24.20 μm for exemplary fiber ex. 24 and R$_{core}$=26 μm for exemplary fiber Ex. 25;

the third column gives the core normalized refractive index Δ$_{core}$ expressed in %;

the fourth and fifth columns respectively show the width w$_2$, expressed in microns, and the depth Dn$_2$, expressed in 10$^{-3}$, of the intermediate cladding;

the sixth and seventh columns respectively show the width w$_3$, expressed in microns, and the depth Dn$_t$, expressed in 10$^{-3}$, of the trench, while the eighth column gives the volume of the trench V$_t$, expressed in μm²;

columns 9 and 10 provide the OFL bandwidth, in MHz·km, respectively at 1060 nm and at 1300 nm;

column 11 indicates the macrobending loss at 1060 nm for two turns with a bending radius 7.5 mm, expressed in dB;

column 12 provides the value of the criterion $Cg_{int}$;

column 13 shows the number of LP modes supported by the MMF fiber according to embodiments of the present disclosure.

$Cg_{int}$ (Ex. 26)=0.61>0.25;
$Cg_{int}$ (Ex. 27)=0.59>0.25;
$Cg_{int}$ (Ex. 28)=0.36>0.25;
$Cg_{int}$ (Ex. 29)=2.07>0.25.

In other words, as regards the intermediate cladding, the ring width $w_2$ and ring index $Dn_2$ are not well designed as a function of the core index $\Delta_{core}$, trench volume $V_t$ and trench

TABLE 2

| Examples | $R_{core}$ (μm) | $\Delta_{core}$ (%) | $w_2$ (μm) | $Dn_2$ ($10^{-3}$) | $w_3$ (μm) | $Dn_t$ ($10^{-3}$) | $V_t$ (μm²) | OFL-BW @1060 nm (MHz · km) | OFL-BW @1300 nm (MHz · km) | $BL_{R=7.5\,mm}$ @1060 nm for 2 turns (dB) | $Cg_{int}$ (a.u) | Nb of LP modes |
|---|---|---|---|---|---|---|---|---|---|---|---|---|
| Ex. 1 | 25.00 | 1.00 | 1.1 | 0.9 | 4.2 | −5.5 | −4.08 | 7648 | 948 | <0.2 | 0.06 | 56 |
| Ex. 2 | 25.00 | 1.00 | 1.6 | −0.2 | 4.5 | −5.0 | −4.08 | 8645 | 1277 | <0.2 | 0.15 | 56 |
| Ex. 3 | 25.00 | 1.00 | 1.3 | 0.3 | 4.6 | −5.0 | −4.08 | 7166 | 1172 | <0.2 | 0.00 | 56 |
| Ex. 4 | 25.00 | 1.00 | 1.1 | 0.7 | 4.6 | −5.0 | −4.08 | 7690 | 1000 | <0.2 | 0.03 | 56 |
| Ex. 5 | 25.00 | 1.00 | 1.1 | 0.5 | 5.0 | −4.5 | −4.08 | 7685 | 1079 | <0.2 | 0.10 | 56 |
| Ex. 6 | 25.00 | 1.00 | 1.1 | 0.4 | 5.6 | −4.0 | −4.08 | 8111 | 1335 | <0.2 | 0.03 | 56 |
| Ex. 7 | 25.00 | 1.00 | 0.8 | 1.3 | 5.7 | −4.0 | −4.08 | 8205 | 1116 | <0.2 | 0.22 | 56 |
| Ex. 8 | 25.00 | 1.00 | 1.1 | 0.1 | 6.3 | −3.5 | −4.08 | 9011 | 1380 | <0.2 | 0.12 | 56 |
| Ex. 9 | 25.00 | 1.00 | 1.6 | −0.2 | 5.8 | −5.0 | −5.35 | 8204 | 1218 | <0.15 | 0.06 | 56 |
| Ex. 10 | 25.00 | 1.00 | 0.8 | 0.2 | 10.9 | −2.5 | −5.35 | 5449 | 1396 | <0.15 | 0.18 | 56 |
| Ex. 11 | 25.00 | 1.00 | 0.8 | 1.2 | 7.2 | −4.0 | −5.35 | 6904 | 976 | <0.15 | 0.11 | 56 |
| Ex. 12 | 25.00 | 1.00 | 1.0 | 0 | 9.3 | −3.0 | −5.35 | 6839 | 1433 | <0.15 | 0.06 | 56 |
| Ex. 13 | 25.00 | 1.00 | 1.0 | 0.6 | 7.2 | −4.0 | −5.35 | 6879 | 1155 | <0.15 | 0.06 | 56 |
| Ex. 14 | 25.00 | 1.00 | 1.0 | 1 | 5.9 | −5.0 | −5.35 | 6739 | 888 | <0.15 | 0.04 | 56 |
| Ex. 15 | 25.00 | 1.00 | 1.3 | −0.2 | 8.0 | −3.5 | −5.35 | 5740 | 1464 | <0.15 | 0.05 | 56 |
| Ex. 16 | 25.00 | 1.00 | 1.3 | 0.2 | 4.3 | −5.0 | −3.86 | 7044 | 1069 | <0.2 | 0.08 | 56 |
| Ex. 17 | 25.00 | 1.00 | 1.0 | 0.6 | 5.4 | −4.0 | −3.87 | 6955 | 1229 | <0.2 | 0.05 | 56 |
| Ex. 18 | 25.00 | 1.00 | 1.0 | −0.2 | 8.2 | −2.5 | −3.87 | 6078 | 1401 | <0.2 | 0.03 | 56 |
| Ex. 19 | 25.00 | 1.00 | 0.8 | 1.2 | 5.4 | −4.0 | −3.87 | 7142 | 1049 | <0.2 | 0.12 | 56 |
| Ex. 20 | 25.00 | 1.00 | 0.8 | 0.2 | 8.2 | −2.5 | −3.87 | 6268 | 1454 | <0.2 | 0.06 | 56 |
| Ex. 21 | 25.00 | 1.00 | 0.8 | 0.6 | 7.0 | −3.0 | −3.87 | 6210 | 1523 | <0.2 | 0.01 | 56 |
| Ex. 22 | 25.00 | 1.00 | 1.5 | 0 | 4.3 | −5.0 | −3.87 | 6162 | 1359 | <0.2 | 0.15 | 56 |
| Ex. 23 | 25.10 | 1.15 | 0.9 | 1.2 | 4.5 | −5.0 | −4.00 | 5039 | 912 | <0.2 | 0.23 | 64 |
| Ex. 24 | 24.20 | 1.05 | 1.1 | 0.4 | 6.4 | −4.3 | −4.90 | 6699 | 1206 | <0.15 | 0.07 | 56 |
| Ex. 25 | 26.00 | 1.10 | 1.1 | 0.2 | 6.6 | −3.9 | −4.90 | 5842 | 1232 | <0.15 | 0.21 | 64 |

Table 3 below summarizes the features of eight exemplary fibers (named Ex. 26 to Ex. 33), which are out of the scope of embodiments of the present disclosure. The structure of Table 3 is the same as that of Table 2, with the same columns corresponding to the same features of the multimode optical fibers, with the same units.

TABLE 3

| Examples | $R_{core}$ (μm) | $\Delta_{core}$ (%) | $w_2$ (μm) | $Dn_2$ ($10^{-3}$) | $w_3$ (μm) | $Dn_t$ ($10^{-3}$) | $V_t$ (μm²) | OFL-BW @1060 nm (MHz · km) | OFL-BW @1300 nm (MHz · km) | $BL_{R=7.5\,mm}$ @1060 nm for 2 turns (dB) | $Cg_{int}$ (a.u) | LP modes |
|---|---|---|---|---|---|---|---|---|---|---|---|---|
| Ex. 26 | 25.00 | 1.00 | 1.1 | 0.2 | 5.8 | −5.0 | −5.26 | 2415 | 660 | <0.15 | 0.61 | 56 |
| Ex. 27 | 25.00 | 1.00 | 1.1 | 1.4 | 5.8 | −5.0 | −5.26 | 1375 | 1871 | <0.15 | 0.59 | 56 |
| Ex. 28 | 25.00 | 1.00 | 1.1 | 0.6 | 7.2 | −4.0 | −5.37 | 1673 | 1790 | <0.15 | 0.36 | 56 |
| Ex. 29 | 25.00 | 1.00 | 1.6 | 0.6 | 8.2 | −2.5 | −3.94 | 725 | 894 | <0.2 | 2.07 | 56 |
| Ex. 30 | 25.00 | 1.00 | 1.1 | 1.4 | 2.6 | −9.0 | −4.08 | 3370 | 570 | <0.2 | 0.11 | 56 |
| Ex. 31 | 25.00 | 1.00 | 1.7 | 0 | 2.6 | −7.2 | −3.23 | 7925 | 1175 | >0.2 | 0.32 | 56 |
| Ex. 32 | 23.50 | 0.89 | 1.0 | 0.8 | 5.2 | −4.5 | −4.00 | 9629 | 1155 | <0.2 | 0.72 | 42 |
| Ex. 33 | 23.75 | 1.00 | 1.0 | 0 | 8.0 | −2.9 | −4.19 | 5951 | 1642 | <0.2 | 0.29 | 49 |

In Table 3, the values printed in bold letters correspond to the features of the exemplary fibers, which are out of the scope of embodiments of the present disclosure.

Multimode optical fibers corresponding to examples Ex. 26, Ex. 27, Ex. 28, Ex. 29 are out of the scope of the present disclosure because the criterion used to optimize the features and design of the intermediate cladding $Cg_{int}$ is above the threshold of 0.25:

width $w_3$. Consequently, the OFL bandwidth at the operating wavelength $\lambda_{op}$=1060 nm is penalized and below 5000 MHz·km:

For example Ex. 26, OFL-BW @1060 nm=2415 MHz·km;

For example Ex. 27, OFL-BW @1060 nm=1375 MHz·km;

For example Ex. 28, OFL-BW @1060 nm=1673 MHz·km;

For example Ex. 29, OFL-BW @1060 nm=725 MHz·km.

Multimode optical fibers corresponding to example Ex. 30 are out of the scope of the present disclosure because the trench is too deep, i.e. the relative refractive index difference of the trench with respect to the outer cladding $Dn_t$ is too low ($Dn_t=-9.0\times10^{-3}$). Consequently, the OFL bandwidth at the wavelength $\lambda=1300$ nm is penalized and below 850 MHz·km (OFL-BW @1300 nm=570 MHz·km).

Multimode optical fibers corresponding to example Ex. 31 are out of the scope of the present disclosure because the criterion used to optimize the features and design of the intermediate cladding $Cg_{int}$ is above the threshold of 0.25: $Cg_{int}$(Ex. 31)=0.32>0.25. The trench volume $V_t=-3.23$ µm² is too small in absolute value (out of the range of values $-5.40$ µm²<$V_t$<$-3.30$ µm²) and the macrobending losses at the operating wavelength $\lambda_{op}=1060$ nm are too high ($BL_{R=7.5\ mm}$ @1060 nm for two turns >0.2 dB).

Multimode optical fibers corresponding to examples Ex. 32 and Ex. 33 are out of the scope of the present disclosure because the criterion used to optimize the features and design of the intermediate cladding $Cg_{int}$ is above the threshold of 0.25:

$Cg_{int}$ (Ex. 32)=0.72>0.25;
$Cg_{int}$ (Ex. 33)=0.29>0.25.

For both examples Ex. 32 and Ex. 33, the optical core outer radius is too small $R_{core}$<24 µm (namely $R_{core}$ (Ex. 32)=23.50 µm and $R_{core}$ (Ex. 33)=23.75 µm) and the number of guided LP modes is too low (namely 42 guided LP modes for Ex. 32 and 49 LP guided modes for Ex. 33), to guarantee good connectivity. These fibers are suffering from high connection losses.

Figure 7:
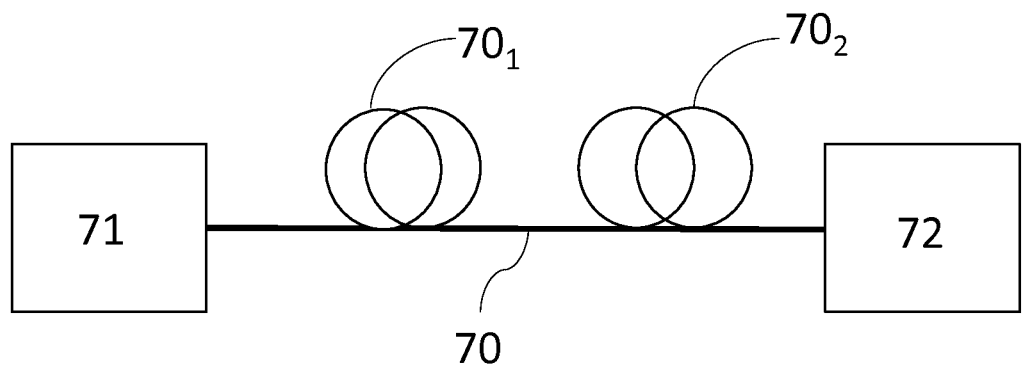
FIG. 7 illustrates a synoptic diagram of a multimode optical system including at least a portion of fiber according to an embodiment of the present disclosure.

FIG. 7 illustrates a synoptic diagram of a multimode optical system including at least a portion of fiber in accordance with the present disclosure. Such an optical system comprises a transceiver 71 and a receiver 72 optically connected by an optical link 70 that includes at least one span of fiber $70_1$, $70_2$. Transceiver 71 may be a VCSEL transmitting at a high bit rate, for example comprised between 40 and 56 Gb/s at a wavelength of 1060 nm. The optical link 70 comprises M spans of fibers $70_1$, $70_2$, as previously described in relation with the previous figures of the present disclosure. In an example, M=1; in another example, M=2; in another example M=5; in yet another example, M=10.

When the optical link 70 is made of at least two portions of fibers $70_1$, $70_2$, which are connected to each other with a radial offset between their optical axes smaller than or equal to two microns, the connection loss between portions of fibers $70_1$, $70_2$ is smaller than 0.25 dB at the operating wavelength $\lambda_{op}$, which is around 1060 nm.

In particular, the optical fiber link 70 may present a bit rate greater than or equal to 10 Gb/s over 100 m. The optical system may also present a rate greater than or equal to 10 Gb/s over 300 m.

The optical fiber in accordance with the invention may advantageously be used in multimode optical systems including VCSELs operating at 1060 nm, to obtain broad bandwidth and low bend losses at the wavelength of 1060 nm, using a high volume and low cost fabrication process. Such optical systems offer the double advantage of energy efficiency and high bit rate. Actually, electrical power consumption of VCSELs operating at 1060 nm is drastically reduced as compared to electrical power consumption of VCSELs operating at 850 nm. Moreover, utilizing wavelength light sources at 1060 nm, for example VCSELs based on InGaAs semiconductors, in conjunction with the multimode optical fiber of the present disclosure enables a transmission system with significantly higher transmission speeds than what is currently available.

Naturally, the present invention is not limited to the embodiments described by way of example.

In particular, the dopant that increases the refractive index is not necessarily germanium. In a variant, it is possible to select phosphorus or aluminum.

The invention claimed is:

1. A multimode optical fiber, comprising an optical core and an optical cladding surrounding said optical core, said optical core having an α graded-index profile with α≥1, α being a non-dimensional parameter that defines the index profile shape of said optical core, and said optical core having a maximal refractive index $n_{core}$ at its center and an outer radius $R_{core}$, said optical cladding comprising an outer cladding having at its outer edge a refractive index $n_{Cl}$, said optical cladding also comprising a trench, which comprises a region of depressed refractive index $n_{trench}$, with a negative refractive index difference $Dn_t=n_{trench}-n_{Cl}$ with respect to said outer cladding, said trench having a width $w_3$, said optical cladding also comprising a region of intermediate cladding, with a refractive index difference $Dn_2$ with respect to said outer cladding, said intermediate cladding having a width $w_2$, and being located between, and in contact with, said optical core and said trench, wherein said multimode optical fiber has a mode carrying capacity supporting propagation of at least fifty-four and at maximum sixty-eight LP modes at an operating wavelength $\lambda_{op}$ between 1050 nm and 1070 nm, said mode carrying capacity being defined by a specific relationship between the Numerical Aperture NA= $\sqrt{(n_{core}^2-n_{Cl}^2)}$ of said optical core at said operating wavelength $\lambda_{op}$ and said optical core outer radius $R_{core}$, wherein said optical core, intermediate cladding and trench satisfy the criterion $Cg_{int}$<0.25, where:

$$Cg_{int}=|1000Dn_2-3.00+2.21w_2+0.290w_3+0.365(V_t/\Delta_{core})|+0.12(R_{core}-25)^4$$

with:

$R_{core}$, $w_2$ and $w_3$ expressed in microns,
$V_t=\pi\{(R_{core}+w_2+w_3)^2-(R_{core}+w_2)^2\}*Dn_t$ a volume of said trench expressed in µm², $$Dn_t \geq -5.5\times10^{-3},$$

$$\Delta_{core} = \frac{(n_{core}^2-n_{Cl}^2)}{2n_{core}^2}\text{ expressed in \%,}$$

and $Dn_2$, $Dn_t$ and $\Delta_{core}$ measured at a wavelength $\lambda=633$ nm, and wherein said optical core has an outer radius 24 µm≤$R_{core}$≤26 µm, a numerical aperture NA between 0.190 and 0.225 at said operating wavelength $\lambda_{op}$, and a value of α between 2.01 and 2.05.

2. The multimode optical fiber of claim 1, wherein the volume of said trench $V_t$ is between $-5.40$ µm² and $-3.30$ µm².

3. The multimode optical fiber of claim 2, wherein the volume of said trench $V_t$ is between $-5.40$ µm² and $-3.60$ µm².

4. The multimode optical fiber of claim 1, wherein said specific relationship between the Numerical Aperture NA= $\sqrt{(n_{core}^2-n_{Cl}^2)}$ of said optical core at said operating wavelength $\lambda_{op}$ and said optical core outer radius $R_{core}$ is:

$$54 \leq \left| \left( 0.0079 * \left( \frac{R_{core} * NA}{\lambda} \right)^2 + 0.82 \right) * \right.$$
$$\left. \left( \left\lfloor \frac{\left( \frac{R_{core} * NA}{\lambda} \right)^2 + 10.1}{3} \right\rfloor * 6 - 10 \right) \right| \leq 68 \quad \text{(Eq. 1)}$$

5. The multimode optical fiber of claim 1, wherein said multimode optical fiber has a mode carrying capacity supporting propagation of at least fifty-six and at maximum sixty-four LP modes at an operating wavelength $\lambda_{op}$ between 1050 nm and 1070 nm, said mode carrying capacity being defined by the relationship:

$$56 \leq \left| \left( 0.0079 * \left( \frac{R_{core} * NA}{\lambda} \right)^2 + 0.82 \right) * \right.$$
$$\left. \left( \left\lfloor \frac{\left( \frac{R_{core} * NA}{\lambda} \right)^2 + 10.1}{3} \right\rfloor * 6 - 10 \right) \right| \leq 64 \quad \text{(Eq. 2)}$$

6. The multimode optical fiber of claim 1, wherein said negative refractive index difference of said trench is such that $Dn_t < -2 \times 10^{-3}$.

7. The multimode optical fiber of claim 1, wherein at said operating wavelength $\lambda_{op}$, said multimode optical fiber has an overfilled launch bandwidth (OFL-BW) greater than 5000 MHz·km.

8. The multimode optical fiber of claim 1, wherein at a wavelength $\lambda = 1300$ nm, said multimode optical fiber has an overfilled launch bandwidth (OFL-BW) greater than 850 MHz·km.

9. The multimode optical fiber of claim 1, wherein at said operating wavelength $\lambda_{op}$, said multimode optical fiber has macrobending losses Max|BL|<0.2 dB for two turns at 7.5 mm bend radius, where BL are the bend losses of different guided modes in said optical fiber, and where Max|BL| is the absolute maximum value of BL for all guided modes.

10. A multimode optical system, comprising at least a portion of a multimode optical fiber according to claim 1.

11. The multimode optical system of claim 10, wherein the multimode optical system presents a data bit rate greater than or equal to 10 Gb/s over 100 m.

12. The multimode optical system of claim 11, wherein the multimode optical system presents a data bit rate greater than or equal to 25 Gb/s over 100 m.

13. The multimode optical system of claim 12, wherein the multimode optical system presents a data bit rate greater than or equal to 50 Gb/s over 50 m.

14. The multimode optical system of claim 10, wherein the multimode optical system presents a data bit rate greater than or equal to 10 Gb/s over 300 m.

15. A multimode optical system, comprising:
 (i) at least a portion of a first multimode optical fiber according to claim 1, and
 (ii) at least a portion of a second multimode optical fiber according to claim 1,
 wherein, when said at least two optical-fiber portions are connected to each other with a radial offset of two microns or less between their respective optical axes, the connection loss between said at least two optical-fiber portions is 0.25 dB or less at said operating wavelength $\lambda_{op}$.

16. The multimode optical system of claim 15, wherein the multimode optical system presents a data bit rate greater than or equal to 10 Gb/s over 100 m.

17. The multimode optical system of claim 15, wherein the multimode optical system presents a data bit rate greater than or equal to 25 Gb/s over 100 m.

18. The multimode optical system of claim 15, wherein the multimode optical system presents a data bit rate greater than or equal to 50 Gb/s over 50 m.

19. The multimode optical system of claim 15, wherein the multimode optical system presents a data bit rate greater than or equal to 10 Gb/s over 300 m.

* * * * *